United States Patent
Bennatan et al.

(10) Patent No.: US 9,965,398 B2
(45) Date of Patent: May 8, 2018

(54) METHOD AND APPARATUS FOR SIMPLIFIED NAMELESS WRITES USING A VIRTUAL ADDRESS TABLE

(71) Applicant: SAMSUNG ELECTRONICS CO., LTD., Suwon-si, Gyeonggi-Do (KR)

(72) Inventors: Amir Bennatan, Ramat Gan (IL); Michael Erlihson, Ramat Gab (IL); Jun Jin Kong, Yongin-si (KR)

(73) Assignee: Samsung Electronics Co., Ltd., Suwon-si, Gyeonggi-Do (KR)

( * ) Notice: Subject to any disclaimer, the term of this patent is extended or adjusted under 35 U.S.C. 154(b) by 133 days.

(21) Appl. No.: 14/993,110

(22) Filed: Jan. 12, 2016

(65) Prior Publication Data
US 2017/0199824 A1    Jul. 13, 2017

(51) Int. Cl.
*G06F 12/02*    (2006.01)
*G06F 12/1009*    (2016.01)
*G06F 3/06*    (2006.01)

(52) U.S. Cl.
CPC .......... *G06F 12/1009* (2013.01); *G06F 3/065* (2013.01); *G06F 3/0619* (2013.01); *G06F 3/0679* (2013.01); *G06F 12/0246* (2013.01); *G06F 12/0253* (2013.01); *G06F 2212/2022* (2013.01); *G06F 2212/7201* (2013.01); *G06F 2212/7205* (2013.01)

(58) Field of Classification Search
None
See application file for complete search history.

(56) References Cited

U.S. PATENT DOCUMENTS

| | | | |
|---|---|---|---|
| 8,527,693 B2 | 9/2013 | Flynn et al. | |
| 8,589,625 B2 | 11/2013 | Colgrove et al. | |
| 2013/0046920 A1 | 2/2013 | Ryu et al. | |
| 2013/0227236 A1 | 8/2013 | Flynn et al. | |
| 2015/0212936 A1* | 7/2015 | Flynn .................. | G06F 11/1048 711/103 |

OTHER PUBLICATIONS

"Virtual Memory". UC Berkeley. <https://inst.eecs.berkeley.edu/~cs61c/fa11/disc/12/week12sol.pdf>. Published Fall 2011.*
Zhang, Yiying, Andrea C. Arpaci-Dusseau, and Remzi H. Arpaci-Dusseau. "Removing the costs and retaining the benefits of flash-based SSD virtualization with FSDV." Mass Storage Systems and Technologies (MSST), 2015 31st Symposium on. IEEE, 2015.*
Arpaci-Dusseau, Andrea C et al., "Removing the Costs of Indirection in Flash-based SSDs with Nameless Writes."
(Continued)

*Primary Examiner* — Charles Rones
*Assistant Examiner* — Hewy Li
(74) *Attorney, Agent, or Firm* — Volentine, Whitt & Francos, PLLC

(57) ABSTRACT

A memory device includes a nonvolatile memory and a memory controller. The memory controller receives first data from a host file system; stores the first data in a first physical block of the nonvolatile memory identified by a first physical page number (PPN); associates the first PPN with a first virtual page number (VPN); and communicates the first VPN to the host file system in response to receiving the first data.

14 Claims, 13 Drawing Sheets

(56) References Cited

OTHER PUBLICATIONS

Jiang, Anxiao et al., "Storage Coding for Wear Leveling in Flash Memories," IEEE Transactions on Information Theory, vol. 56, No. 10, Oct. 2000, pp. 5290-5299.
Peleato, Borja et al., "Analysis of Trade-offs in V2P-Table Design for NAND Flash."
Chen, Feng et al., "CAFTL: A Content-Aware Flash Translation Layer Enhancing the Lifespan of Flash Memory based Solid State Drives."
Bonnet, Phillippe et al., "Flash Device Support for Database Management."
Mohan, Vidy Abhushan et al., "refresh SSDs: Enabling High Endurance, Low Cost Flash in Datacenters."
Kang, Yangwoo et al., "Object-based SCM—An Efficient Interface for Storage Class Memories."
Lee, Sungjin et al., "FlexFS: A Flexible Flash File System for MLC NAND Flash Memory," USENIX Annual Technical Conference 2009.
Rajimwale, Abhishek et al., "Block Management in Solid-State Devices."
Zhang, Yiying et al., "De-indirection for Flash-based SSDs with Nameless Writes," 2012 10th USENIX Conference on File and Storage Technologies, San Jose, CA, Feb. 14-17, 2012.
Mesnier, Mike et al., "Object-Based Storage," IEEE Communications Magazine, Aug. 2003, pp. 84-90.

\* cited by examiner

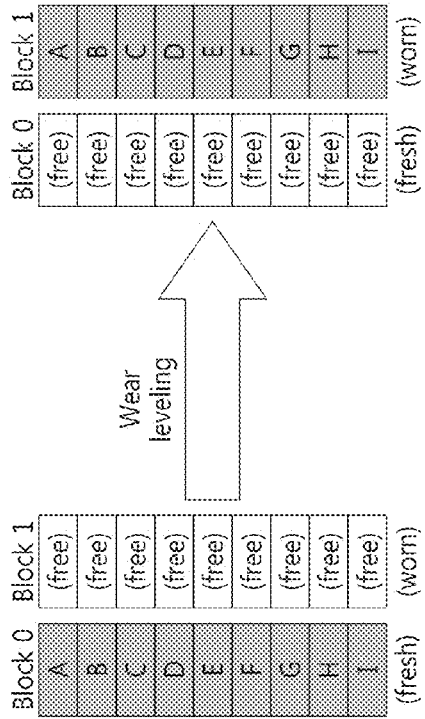
FIG. 3A (Related Art)
FIG. 3D (Related Art)
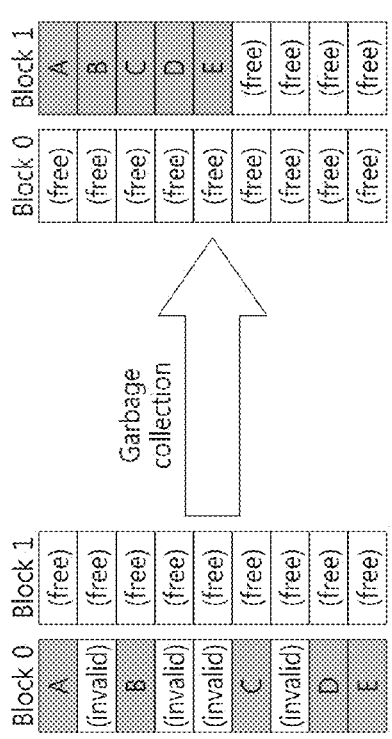
FIG. 3B (Related Art)

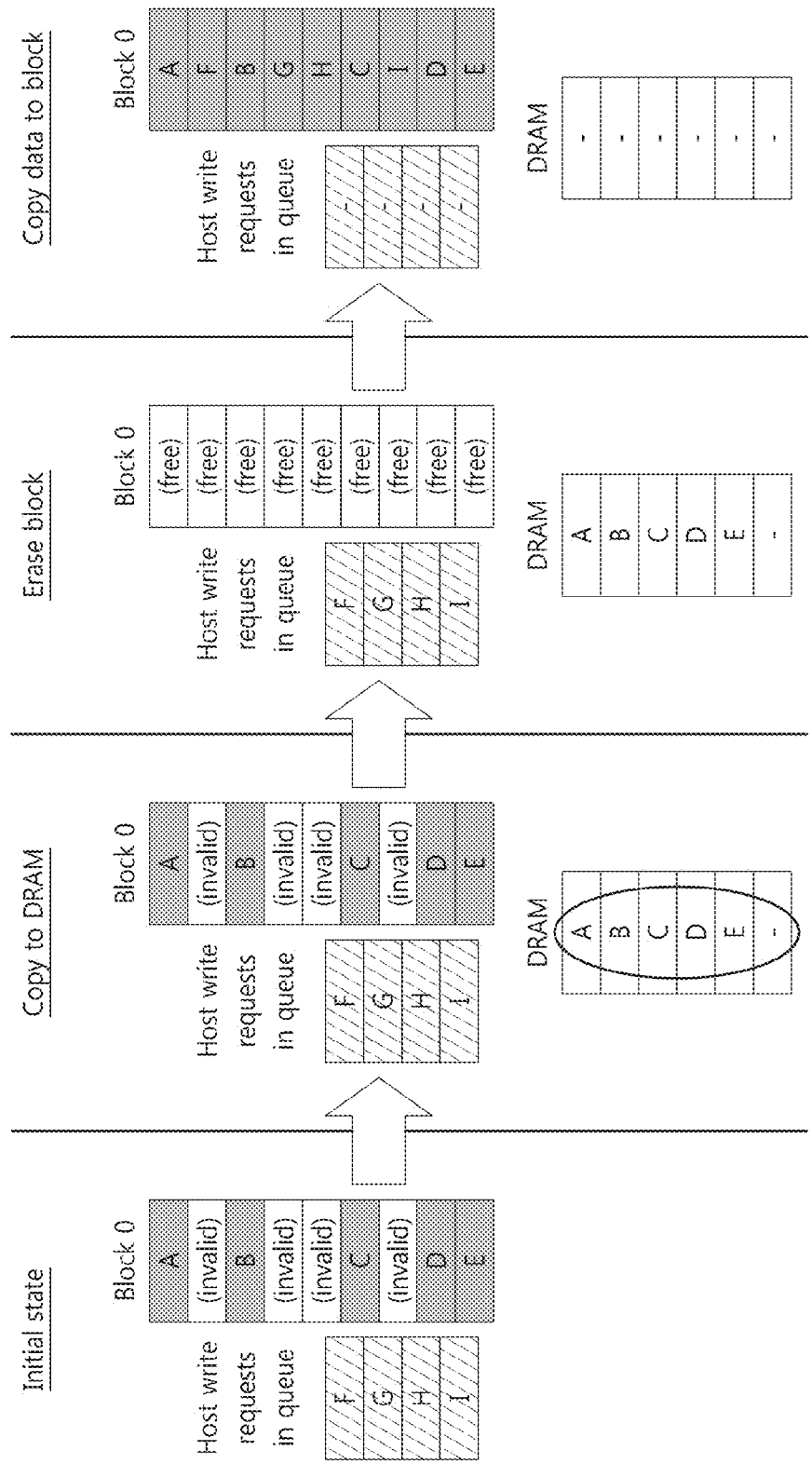

METHOD AND APPARATUS FOR SIMPLIFIED NAMELESS WRITES USING A VIRTUAL ADDRESS TABLE

BACKGROUND

1. Technical Field

The present disclosure relates to managing data stored in blocks of a nonvolatile memory through a file translation layer.

2. Description of the Related Art

FIG. 1A illustrates a related-art method of storing data in a memory device using a logical-to-physical page translation. FIG. 1B illustrates the related-art method of FIG. 1A pictorially. According to the method, a flash translation layer (FTL) 100 receives 110 from a host file system (HFS) 105 a logical page number (LPN) and data. Flash translation layer 100 stores 120 the received data in a memory space identified by a physical page number (PPN) and associates 130 the LPN with the PPN where the data is stored. The associations among LPNs and PPNs for all pages of the memory device are maintained in a logical-to-physical address table by flash translation layer 100.

FIG. 1C illustrates a related-art method of retrieving data stored in a memory device using a logical-to-physical page translation. FIG. 1D illustrates the related-art method of FIG. 1C pictorially. According to the method, flash translation layer 100 receives 140 from host file system 105 an LPN. Flash translation layer 100 identifies 150 the PPN associated with the LPN received from host filing system 105. Such identification is made by referencing the logical-to-physical address table using the LPN as an index value. Flash translation layer 100 retrieves 160 the data stored in the memory space identified by the identified PPN and communicates 170 the retrieved data to host filing system 105.

A drawback of the methods illustrated by FIGS. 1A-1D is the large amount of memory required to maintain the logical-to-physical address table in the memory device. In addition to the logical-to-physical address table, though not described above, the file transfer layer 100 must maintain a bitmap to identify the status (e.g., free space, used space) of every data page in the storage device.

FIG. 2A illustrates a related-art method of storing data in a memory device using nameless writes. FIG. 2B illustrates the related-art method of FIG. 2A pictorially. According to this method, a flash translation layer 200 receives 210 data from a host file system 205. Flash translation layer 200 stores 220 the received data within a page of a nonvolatile memory identified by a PPN. Flash translation layer 205 communicates 230 the PPN where the data is stored within the memory device to host file system 205. Host file system 205 maintains PPNs for all pages of the memory device in a file allocation table or Mode table.

FIG. 2C illustrates a related-art method of retrieving data stored in a memory device using nameless writes. FIG. 2D illustrates the related-art method of FIG. 2C pictorially. According to the method, flash translation layer 200 receives 250 a PPN from host file system 205. Flash translation layer 200 retrieves 260 the data stored at the received PPN of the memory device and communicates 270 the retrieved data to host file system 205.

Host file system 205 maintains a file allocation table or Mode table for every file stored within every memory block. The logical-to-physical address table described in connection with FIGS. 1A-1D is eliminated from the file translation layer 200, thus freeing a large amount of memory. For example, this can enable a reduction of the amount of RAM required for the storage device. Furthermore, the file translation layer does not update a logical-to-physical address for data read or write operations.

FIG. 3A illustrates a related-art, garbage-collection operation performed using the nameless-writes methodology for managing memory. FIG. 3B illustrates a related-art file allocation table maintained by a host file system during the garbage-collection operation illustrated by FIG. 3A. As illustrated in FIG. 3A, block 0 contains valid pages A through E and multiple invalid pages of data. So as to recover the memory space containing the invalid pages, flash translation layer 200 moves valid pages A through E to block 1 of the memory and frees all of the pages within block 0. After the garbage-collection operation illustrated by FIG. 3A is completed, the file allocation table illustrated by FIG. 3B now contains outdated PPN information.

More specifically, the file allocation table illustrated by FIG. 3B indicates that page A is stored in page 0 of block 0, page B is stored in page 2 of block 0 and page C is stored in page 5 of block 0, in accordance with their original storage locations illustrated by the left-side pane of FIG. 3A. However, after the valid pages of block 0 are moved to block 1 by the garbage-collection operation illustrated by the right-side pane of FIG. 3A, the file allocation table should reflect that page A is stored in page 0 of block 1, page B is stored in page 1 of block 1 and page C is stored in page 2 of block 1.

FIG. 3C illustrates a related-art method of in-place garbage collection performed using the nameless-writes methodology for managing memory. According to this method, file translation layer 200 stores pages received from host file system 205 in a queue until the sum of the number of pages in the queue and the number of valid pages within a block is enough to fill a block of memory. As illustrated for an initial state in FIG. 3C, block 0 contains valid pages A through E and four invalid pages. File translation layer 200 has stored pages F through I, which were received from host file system 205, in a queue. Thus, file translation layer 200 has enough pages to fill a block of memory.

To execute the in-place garbage collection, file translation layer 200 will ultimately store both the valid pages of block 0 and the pages temporarily stored within the queue in block 0. To accomplish this, file translation layer 200 must erase the invalid pages from block 0. However, file translation layer 200 can only erase an entire block, not individual pages within the block. Therefore, file translation layer 200 copies valid pages A through E to a dynamic random-access memory (DRAM), as illustrated in the second pane of FIG. 3C. Thereafter, file translation layer 200 erases all of the pages of block 0, as illustrated in the third pane of FIG. 3C. The in-place garbage-collection operation is completed by file translation layer 200 copying valid pages A through E from the DRAM to block 0 in the same page locations they had in their initial state and copying pages F through I from the queue to the remaining page locations of block 0.

The in-place garbage-collection operation illustrated by FIG. 3C overcomes the problem of creating outdated PPN information in the file allocation table. However, a very large DRAM is required to temporarily hold all of the valid pages while the block from which they came is erased. Also, a large capacitor or battery is required to maintain power for the DRAM in the event of a power failure; otherwise, the data stored in the DRAM will be lost during such power failure.

Additionally, the in-place garbage-collection operation produces inefficiencies if the sum of the queued pages and valid pages within a block are insufficient to fill the block. In this event, file translation layer 200 either creates a block with unused page space or waits for the queue to fill before completing the garbage collection. If the garbage collection has already begun, the DRAM will consume power while it temporarily stores the valid pages copied from the block undergoing the garbage collection.

Another way for overcoming the problem of creating outdated PPN information in the file allocation table is to update the file allocation table within host file system 205 through a call-back operation. This may be accomplished by having file translation layer 200 communicate both the outdated PPNs and the new, replacement PPNs to host file system 205. Host file system 205 updates the file allocation table with the received information and informs file translation layer 200 that the update is complete. However, the call-back operation is non-standard and requires processor resources of host file system 205.

FIG. 3D illustrates a related-art method of wear leveling using the nameless-writes methodology of managing memory. As illustrated in FIG. 3D, block 0 is a fresh block of a memory containing valid pages A through I of data. Block 1 is a worn block of the memory containing nothing but free pages. File translation layer 200 copies valid pages A through I from block 0 to block 1 and erases all pages within block 0. Thus, valid pages A through I are transferred from fresh block 0 to worn block 1 by the wear-leveling operation. However, just as was the case with the garbage-collection operation illustrated by FIG. 3A, the file allocation table maintained by host file system 205 is outdated, as similarly illustrated in FIG. 3B. The file allocation table must be updated using the call-back operation described above.

The present disclosure builds upon the benefits of the nameless-writes methodology for managing a nonvolatile memory by overcoming drawbacks of the nameless-writes methodology. The benefits of nameless writes are the absence of a logical-block-address bitmap during file operations, the absence of a logical-to-physical table for writing data, and the absence of a logical-to-physical table access for data read operations.

SUMMARY

According to an exemplary embodiment of the disclosure, there is provided a method, executed by a memory controller, of accessing data within a memory. The method includes: receiving first data from a host file system; storing the first data in a first physical block of the memory identified by a first physical page number (PPN); associating the first PPN with a first virtual page number (VPN); and communicating the first VPN to the host file system in response to receiving the first data.

The first PPN may include a first physical block address (PBA) identifying the first physical block and a page-number-in-block (PNIB) identifying a first page within the first physical block in which the first data is stored.

The method may further include: copying the first data stored at the first PBA to a second PBA of the memory; and associating the second PBA with a first virtual block address (VBA) corresponding to the first VPN.

The PNIB identifying the first page within the first PBA in which the first data is stored may be the same PNIB identifying a second page within the second PBA to which the first data is copied.

The method may further include eliminating an association existing between the first VBA and the first PBA upon associating the first VBA with the second PBA.

The method may further include erasing the first data stored at the first PBA upon eliminating the association between the first VBA and the first PBA.

The method may further include identifying the first PBA as a free block for storing new data upon erasing the first data stored at the first PBA.

The method may further include: receiving second data from the host file system; storing the second data at a second PPA of the second PBA; associating the second PPA with a second VBA corresponding to a second VPN; and communicating the second VPN to the host file system in response to receiving the second data.

The method may further include receiving the first VPN from the host file system; identifying the first PPN from the received first VPN based upon their association; retrieving the first data from the memory using the identified first PPN; and communicating the retrieved first data to the host file system in response to receiving the first VPN.

The first VPN may include: (1) a virtual block address (VBA) corresponding to the first PBA where the first data is stored within the memory and (2) the PNIB included in the first PPN. The method may further include: receiving the first VPN from the host file system; generating the first PPN by substituting, within the first VPN, the first PBA corresponding to the VBA included within the first VPN; retrieving the first data from the memory using the identified first PPN; and communicating the retrieved first data to the host file system in response to receiving the first VPN.

According to another exemplary embodiment of the disclosure, there is provided a memory device including a nonvolatile memory and a memory controller. The memory controller: receives first data from a host file system; stores the first data in a first physical block of the nonvolatile memory identified by a first physical page number (PPN); associates the first PPN with a first virtual page number (VPN); and communicates the first VPN to the host file system in response to receiving the first data.

The first PPN may include a first physical block address (PBA) identifying the first physical block and a page-number-in-block (PNIB) identifying a first page within the first physical block in which the first data is stored.

The controller may further: copy the first data stored at the first PBA to a second PBA of the nonvolatile memory; and associate the second PBA with a first virtual block address (VBA) corresponding to the first VPN.

The PNIB identifying the first page within the first PBA in which the first data is stored may be the same PNIB identifying a second page within the second PBA to which the first data is copied.

The controller may further eliminate an association existing between the first VBA and the first PBA upon associating the first VBA with the second PBA.

The controller may further erase the first data stored at the first PBA upon eliminating the association between the first VBA and the first PBA.

The controller may further: receive second data from the host file system; store the second data at a second PPA of the second PBA; associate the second PPA with a second VBA corresponding to a second VPN; and communicate the second VPN to the host file system in response to receiving the second data.

The controller may further: receive the first VPN from the host file system; identify the first PPN from the received first VPN based upon their association; retrieve the first data from the nonvolatile memory using the identified first PPN; and communicate the retrieved first data to the host file system in response to receiving the first VPN.

The first VPN may include: (1) a virtual block address (VBA) corresponding to the first PBA where the first data is stored within the nonvolatile memory and (2) the PNIB included in the PPN. The controller may further: receive the first VPN from the host file system; generate the first PPN by substituting, within the first VPN, the first PBA corresponding to the VBA included within the first VPN; retrieve the first data from the nonvolatile memory using the identified first PPN; and communicate the retrieved first data to the host file system in response to receiving the first VPN.

According to another exemplary embodiment of the disclosure, there is provided a non-transitory computer-readable storage medium storing instructions that when executed by a processor cause the processor to perform a method of accessing data within a memory. The method includes: receiving first data from a host file system; storing the first data in a first physical block of the memory identified by a first physical page number (PPN); associating the first PPN with a first virtual page number (VPN); and communicating the first VPN to the host file system in response to receiving the first data.

BRIEF DESCRIPTION OF THE DRAWINGS

The accompanying drawings are included to provide a further understanding of the present disclosure, and are incorporated in and constitute a part of this specification. The drawings illustrate example embodiments of the present disclosure and, together with the description, serve to explain principles of the present disclosure. In the drawings:

FIG. 3A illustrates a related-art, garbage-collection operation performed using the nameless-writes methodology for managing memory;

FIG. 3B illustrates a related-art file allocation table maintained by a host file system during the garbage-collection operation illustrated by FIG. 3A;

FIG. 3C illustrates a related-art method of in-place garbage collection performed using the nameless-writes methodology for managing memory;

FIG. 3D illustrates a related-art method of wear leveling using the nameless-writes methodology of managing memory;

DETAILED DESCRIPTION OF EMBODIMENTS

The advantages and features of the present disclosure and methods of achieving them will be apparent from the following example embodiments that will be described in more detail with reference to the accompanying drawings. It should be noted, however, that the present disclosure is not limited to the following example embodiments, and may be implemented in various forms. Accordingly, the example embodiments are provided only to let those skilled in the art know the concept of the disclosed subject matter.

The terms used in the present disclosure are for the purpose of describing particular embodiments only and are not intended to be limiting of the present disclosure. As used in the specification, the singular forms "a," "an," and "the" are intended to include the plural forms as well, unless the context clearly indicates otherwise. It will be further understood that the terms "comprises" and/or "comprising", when used in the present disclosure, specify the presence of stated features, integers, steps, operations, elements, and/or components, but do not preclude the presence or addition of one or more other features, integers, steps, operations, elements, components, and/or pages thereof.

A configuration illustrated in each conceptual diagram should be understood just from a conceptual point of view. Shape, structure, and size of each component illustrated in each conceptual diagram may be exaggerated or downsized for understanding of the present disclosure. An actually-implemented configuration may have a physical shape different from a configuration of each conceptual diagram. The present disclosure is not limited to a physical shape or size illustrated in each conceptual diagram.

The device configuration illustrated in each block diagram is provided to help convey an understanding of the present disclosure. Each block may include smaller blocks according to function. Alternatively, a plurality of blocks may form a larger block according to a function. That is, the present disclosure is not limited to the components illustrated in each block diagram.

Figure 1A:
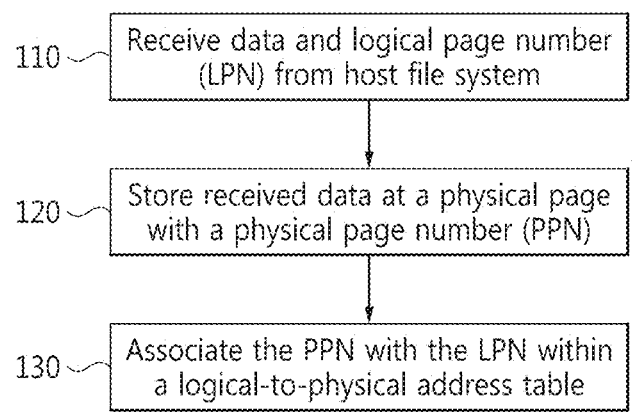
FIG. 1A illustrates a related-art method of storing data in a memory device using a logical-to-physical page translation.
Figure 1B:
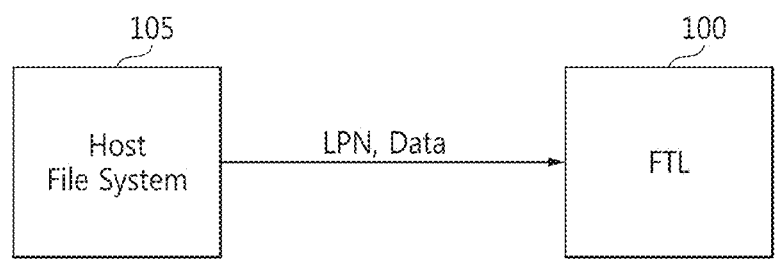
FIG. 1B illustrates the related-art method of FIG. 1A pictorially.
Figure 1C:
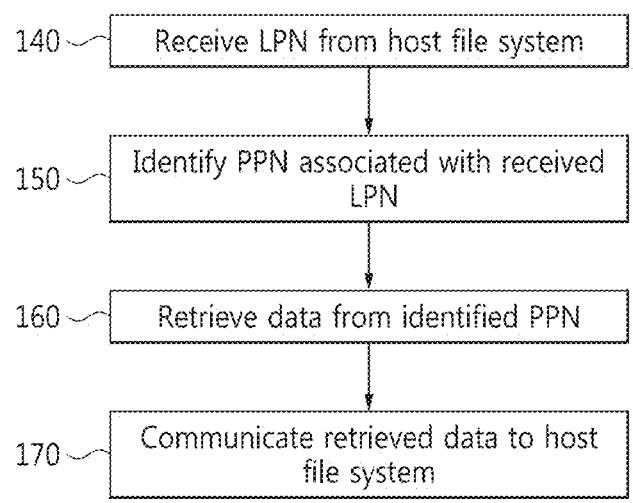
FIG. 1C illustrates a related-art method of retrieving data stored in a memory device using a logical-to-physical page translation.
Figure 1D:
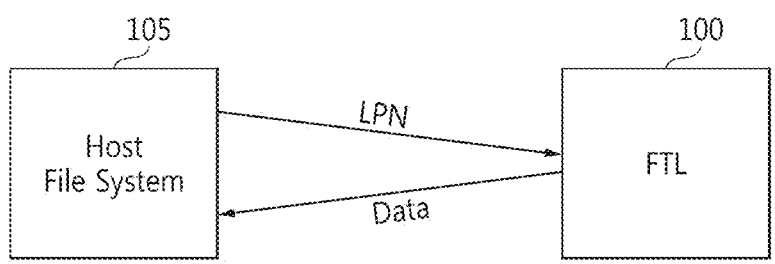
FIG. 1D illustrates the related-art method of FIG. 1C pictorially.
Figure 2A:
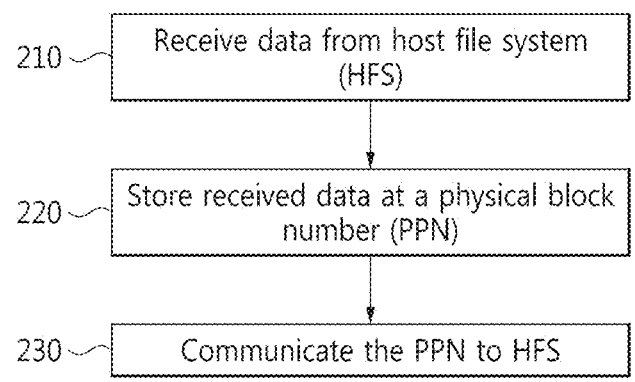
FIG. 2A illustrates a related-art method of storing data in a memory device using nameless writes.
Figure 2B:
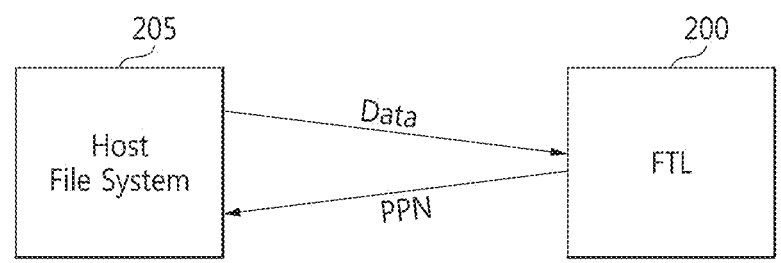
FIG. 2B illustrates the related-art method of FIG. 2A pictorially.
Figure 2C:
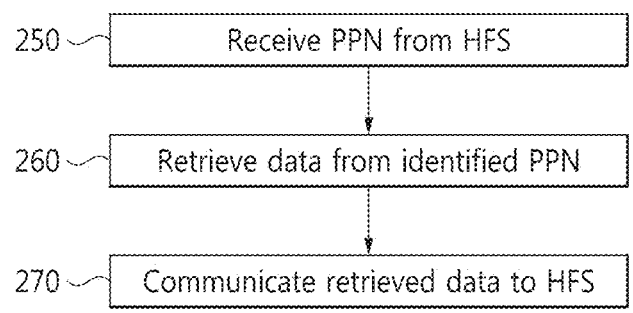
FIG. 2C illustrates a related-art method of retrieving data stored in a memory device using nameless writes.
Figure 2D:
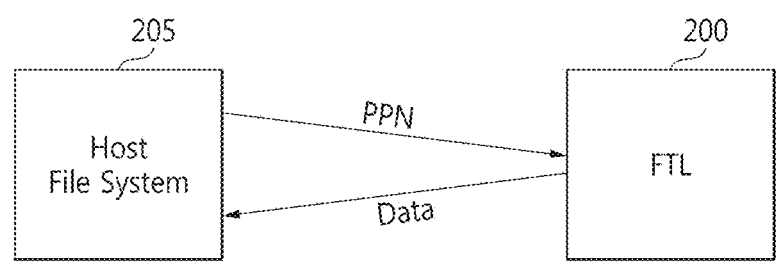
FIG. 2D illustrates the related-art method of FIG. 2C pictorially.
Figure 4:
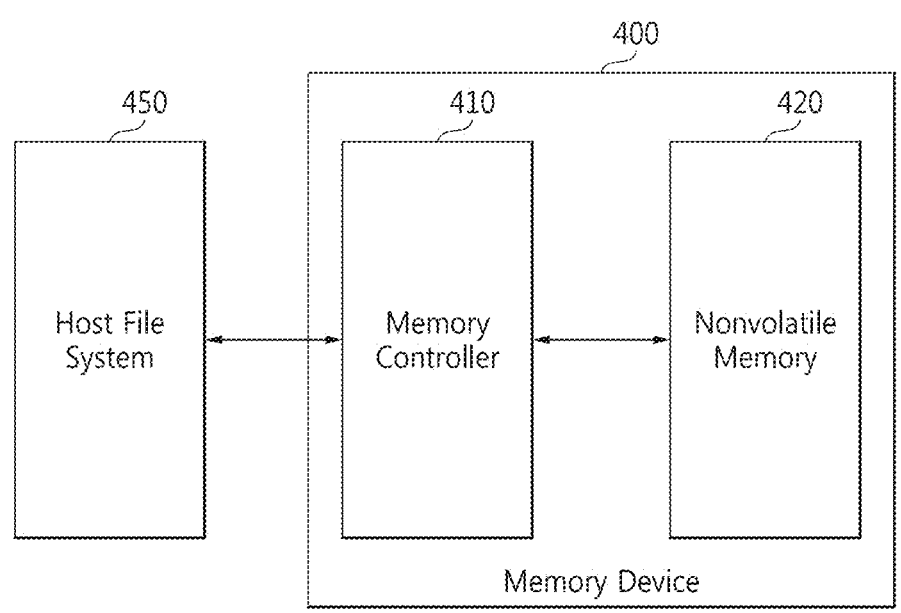
FIG. 4 illustrates a memory management system according to an embodiment of the disclosure.

FIG. 4 illustrates a memory management system according to an embodiment of the disclosure. A memory device 400 includes a memory controller 410 and a nonvolatile memory 420. Memory device 400 may include other components, such as address decoders, one or more input/output data buffers, a voltage generator, a random access memory (RAM), a power source, etc., but such components are not illustrated or described further as their functionality is unimportant to the subject matter of the disclosure. Memory controller 410 receives data from a host file system 450 for storage in nonvolatile memory 420 and reads data stored by nonvolatile memory 420 for conveyance to host file system 450 upon request by host file system 450. Nonvolatile memory 420 may be a NAND memory or NAND flash memory. Memory controller 410 controls the operations for storing data into nonvolatile memory 420 and retrieving data from nonvolatile memory 420. Memory controller 410 may include a flash translation layer.

Figure 5A:
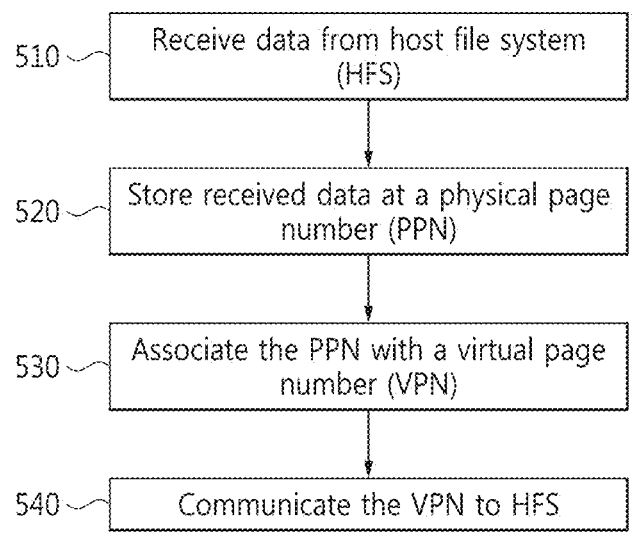
FIG. 5A illustrates a method of storing data in a memory device, according to an embodiment of the disclosure.
Figure 5B:
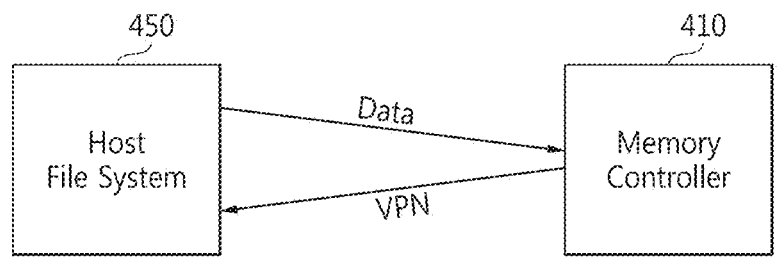
FIG. 5B illustrates the method of FIG. 5A pictorially.

FIG. 5A illustrates a method of storing data in a memory device, according to an embodiment of the disclosure. FIG. 5B illustrates the method of FIG. 5A pictorially. The method may be executed by memory controller 410. According to the method, memory controller 410 receives 510 data from host file system 450. Memory controller 410 stores 520 the received data within a page of nonvolatile memory 420 identified by a physical page number (PPN). Memory controller 410 computes 530 a virtual page number (VPN) having a virtual block address (VBA) associated with the physical block address (PBA) component of the PPN, which includes the PBA and a page-number-in-block (PNIB). The association between the VBA and PBA is stored within a virtual-to-physical translation table maintained by memory controller 410. This table associates VBAs and PBAs in a one-to-one translation. Memory controller 410 communicates 540 the VPN to host file system 450. The association between a VBA and PBA is made when the first page of data is written to a fresh physical block.

Figure 5C:
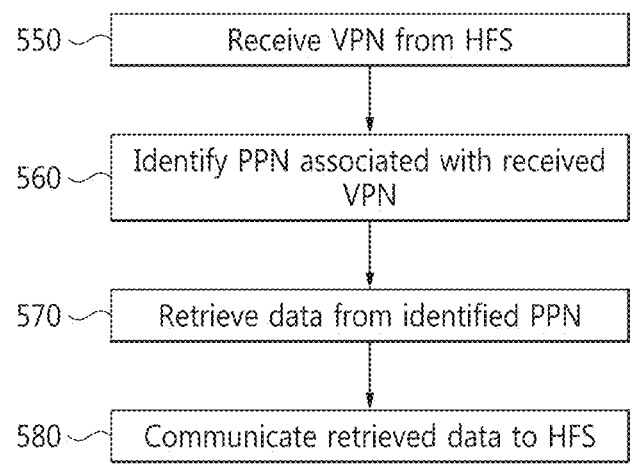
FIG. 5C illustrates a method of retrieving data in a memory device, according to an embodiment of the disclosure.
Figure 5D:
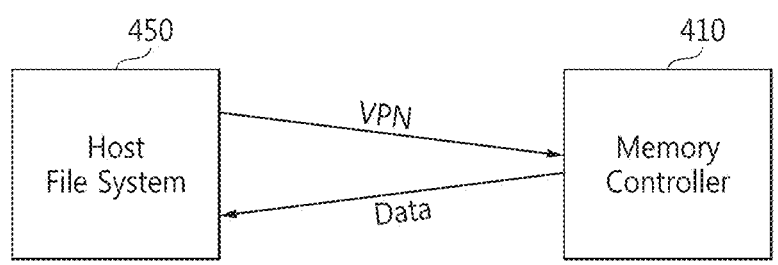
FIG. 5D illustrates the method of FIG. 5C pictorially.

FIG. 5C illustrates a method of retrieving data in a memory device, according to an embodiment of the disclosure. FIG. 5D illustrates the method of FIG. 5C pictorially. The method may be executed by memory controller 410. According to the method, memory controller 410 receives 550 a virtual page number (VPN) from host file system 450. Memory controller 410 constructs 560 the physical page number (PPN) associated with the received VPN by referencing the virtual-to-physical translation table and replacing the VBA portion of the VPN with its associated PBA portion of the PPN. The association between the PBA and the VBA occurred during the storage of the data to the first page of the block of nonvolatile memory 420 identified by the physical page number, as described above in connection with FIGS. 5A and 5B. Memory controller 410 retrieves 570 the data stored at the physical page number of nonvolatile memory 420 identified by operation 560 and communicates 580 the retrieved data to host file system 450.

Figure 6A:
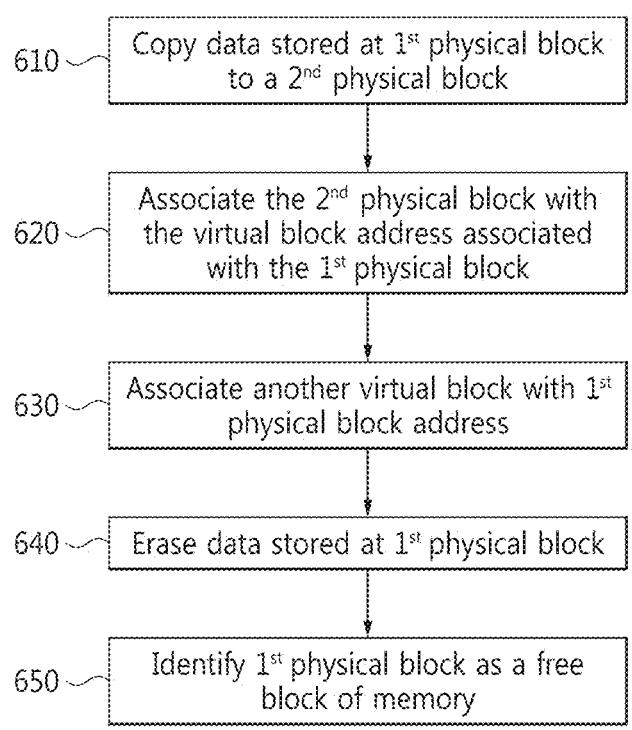
FIG. 6A illustrates a method of executing wear leveling in a memory device, according to an embodiment of the disclosure.
Figure 6B:
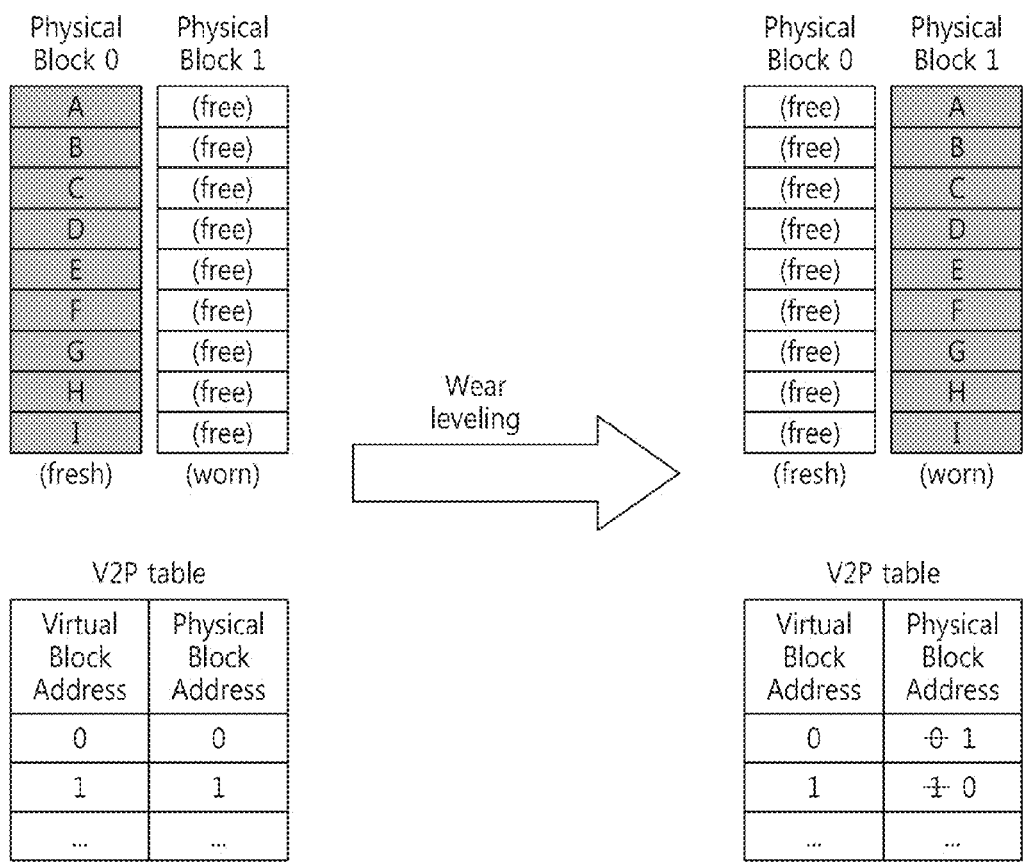
FIG. 6B illustrates the method of FIG. 6A pictorially.

FIG. 6A illustrates a method of executing wear leveling in a memory device, according to an embodiment of the disclosure. FIG. 6B illustrates the method of FIG. 6A pictorially. The method may be executed by memory controller 410. According to the method, memory controller 410 copies 610 data stored in pages of nonvolatile memory 420 identified by a first physical block address to pages of nonvolatile memory 420 identified by a second physical block address. In the example illustrated by FIG. 6B, data pages A through I within physical block address 0, which is a fresh block of memory space, are copied to physical block address 1, which is a worn block.

Memory controller 410 associates 620, within the virtual-to-physical address table, the second physical block address with the virtual block address currently associated with the first physical block address, and associates 630 another virtual block address with the first physical block address. The association between the first physical block address and the virtual block address occurred during the storage of the first data to the block of nonvolatile memory 420 identified by the first physical block address, as described above in connection with FIGS. 5A and 5B. In the example illustrated by FIG. 6B, physical block address 0 was associated with virtual block address 0 and physical block address 1 was associated with virtual block address 1 prior to data pages A through I being copied from physical block address 0 to physical block address 1. After data pages A through I are copied to physical block address 1, memory controller 410 associates 620 physical block address 1 with virtual block address 0 and associates 630 physical block address 0 with virtual block address 1.

Memory controller 410 erases 640 the data stored at the first physical block address and identifies 650 the memory space of the first physical block address as free memory. Such free memory is illustrated in FIG. 6B by the notation of "free" within the data pages of physical block address 0.

By performing the method discussed in connection with FIG. 6A, memory controller 410 may execute wear leveling without communicating revised address information to host file system 450. More specifically, although the data originally stored at physical block address 0 has been moved to physical block address 1 of nonvolatile memory 420, the virtual page number by which host file system 450 acquires this data is unchanged by the wear-leveling operation.

Figure 7A:
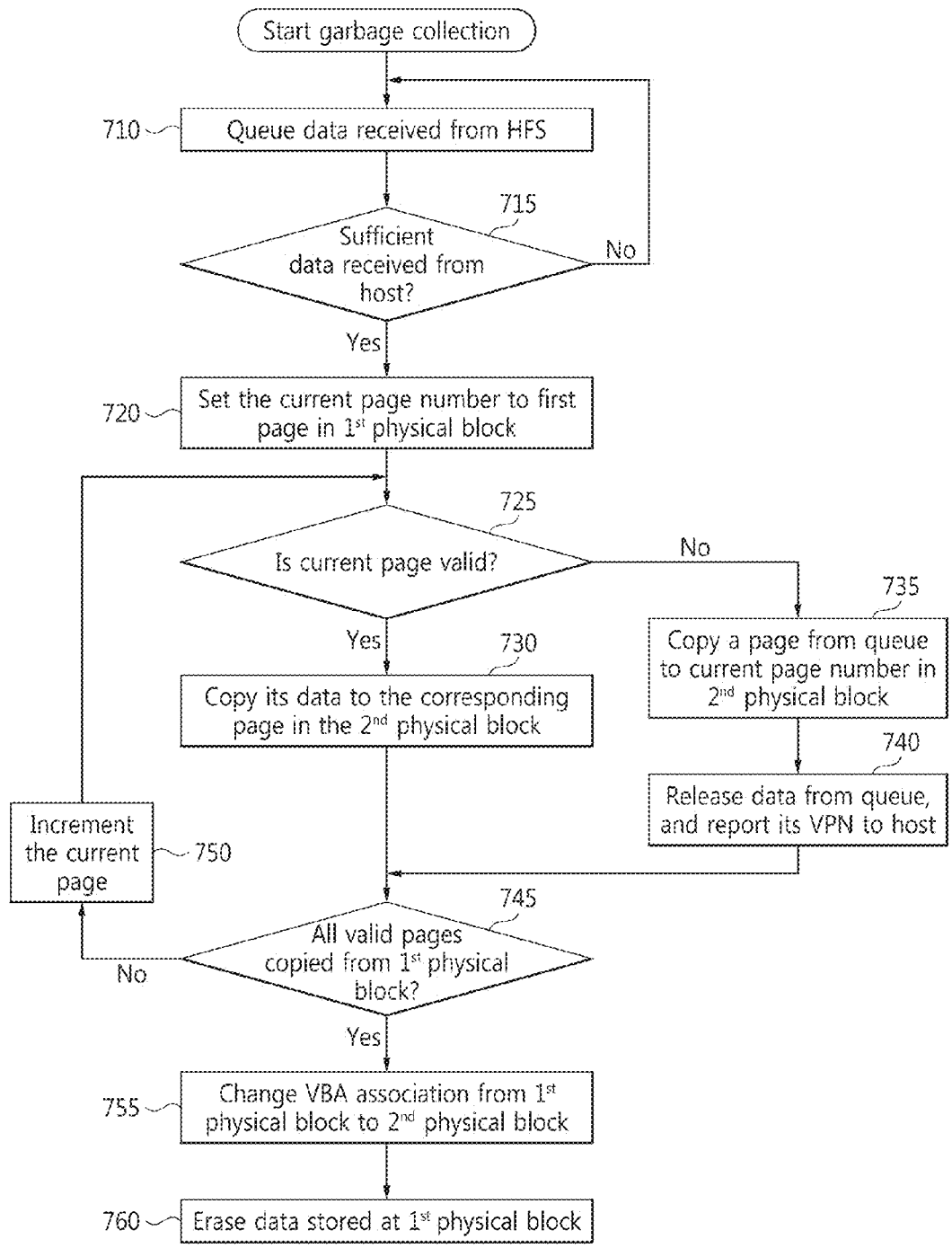
FIG. 7A illustrates a method of recovering invalid data pages within a memory device, according to an embodiment of the disclosure.
Figure 7B:
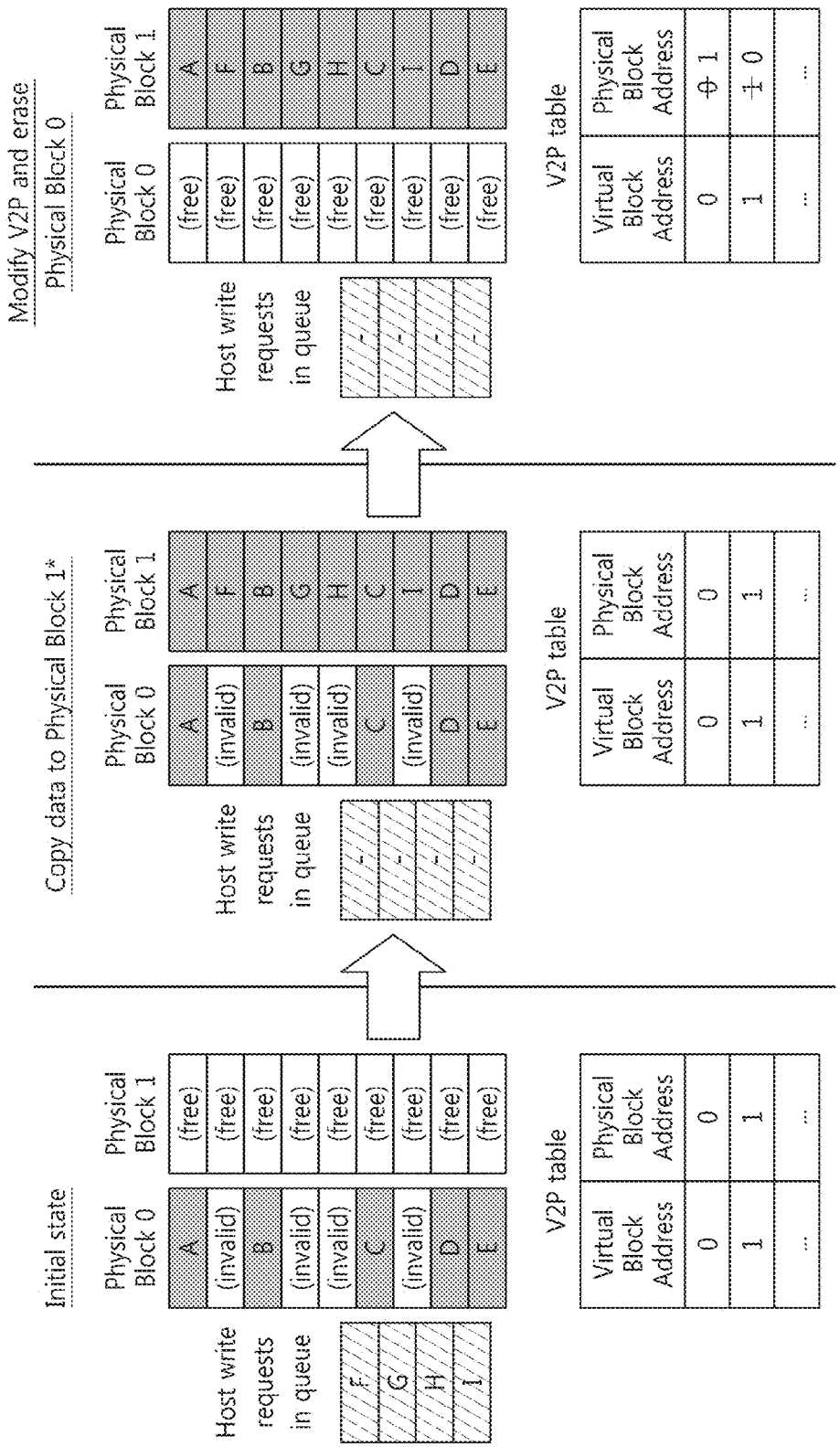
FIG. 7B illustrates the method of FIG. 7A pictorially.

FIG. 7A illustrates a method of performing garbage collection within a memory device, according to an embodiment of the disclosure. FIG. 7B illustrates the method of FIG. 7A pictorially. The method may be executed by memory controller 410.

According to the method, memory controller 410 queues 710 data pages received from host file system 450 for storage in nonvolatile memory 420. Memory controller 410 determines 715 whether sufficient pages have been queued to enable garbage collection. The criterion for the determination is whether sufficient pages exist to fill-in for pages that are invalid in a block that is designated for garbage collection.

If memory controller 410 determines 715 that sufficient pages have been queued, memory controller 410 sets 720 a current page to be a first PNIB in a first physical block. Memory controller 410 determines 725 whether the current page is valid. If yes, memory controller 410 copies 730 the current page to a second physical block. Otherwise, memory controller 410 copies 735 a page from the queue to the second physical block, releases 740 the copied page from the queue, and communicates 740 a VPN for the copied page to the host. This VPN corresponds to the pair of numbers: (1) a virtual block address of the first physical block and (2) a page-number-in-block of the current physical page. Memory controller 410 determines 745 whether all the valid pages in the first physical block have all been copied to the second physical block. If no, then memory controller 410 increments 750 the current page number and repeats another loop of operations 725-745.

In the example illustrated by the left-most and center panes of FIG. 7B, the valid pages A through E stored in physical block address 0 are copied to physical block address 1 and four pages from the queue are copied to physical block address 1. Thus, as illustrated in the center pane of FIG. 7B, physical block address 1 is entirely full of valid data pages A through I.

Memory controller 410 changes 755 the association of the virtual block address with the first physical block to an association with the second physical block. The association between this virtual block address and the first physical block occurred during the storage of the data to a page of the first physical block, as described above in connection with FIGS. 5A and 5B. In the example illustrated by FIG. 7B, physical block address 0 was associated with virtual block address 0 and physical block address 1 was associated with virtual block address 1 prior to garbage collection, and this association is reversed at the end of the garbage collection.

This association is reflected in the virtual-to-physical address table illustrated in the left-most pane of FIG. 7B.

Memory controller 410 erases 760 the data stored at the first physical block, and its pages thus become free. Such free space is illustrated in the right-most pane of FIG. 7B by the notation of "free" within the data pages of physical block address 0.

In the example illustrated by FIG. 7B, the outcome of the garbage collection is transparent to the host. Specifically, the VPN addresses of pages A-E, which were valid in the first physical block, remain unchanged, because by changing VBA 0 from an association with physical block address 0 to physical block address 1, a file translation layer (FTL) of memory controller 410 has made the original VPN addresses, which were known to the host, point to the correct new locations of pages A-E. The garbage-collection was in-place in the sense that the page-numbers-in-block of the pages that were copied from the first physical block to the second physical block, were preserved.

Memory controller 410 may be a computer processor, an application-specific integrated circuit (ASIC), a field-programmable gate array (FPGA), or another form of circuitry. The pages described herein may be any size deemed convenient.

Operations of memory controller 410 may be executed, instead, by host 450. Each of host 450 and memory controller 410 may be an electronic processor, a computer, or an electronic circuit. The methods disclosed herein may be executed by memory controller 410 or host 450 according to instructions for implementing the methods that are stored within a non-transitory computer-readable storage medium. The computer-readable medium may be nonvolatile memory 420, a random access memory (RAM), or some other internal or external medium accessible to memory controller 410 or host 450.

The operations illustrated in the drawings are illustrative of one or more embodiments of the disclosure, but are not limited to the sequence illustrated. Some operations may be omitted and additional operations may be included in embodiments of the disclosure. Also, the sequence of the operations may be changed and some operations may be performed either simultaneously or in sequence.

While the present disclosure has been particularly shown and described with reference to example embodiments thereof, the present disclosure is not limited to the above-described example embodiments. It will be understood by those of ordinary skill in the art that various changes and variations in form and details may be made therein without departing from the spirit and scope of the present disclosure as defined by the following claims.

What is claimed is:

1. A method, executed by a memory controller, of accessing data within a memory, the method comprising:
receiving first data from a host file system;
storing the first data in a first physical block of the memory identified by a first physical page number (PPN), wherein the first PPN includes a first physical block address (PBA) identifying the first physical block and a page-number-in-block (PNIB) identifying a first page within the first physical block in which the first data is stored;
associating the first PPN with a first virtual page number (VPN), wherein the first VPN includes: (1) a first virtual block address (VBA) corresponding to the first PBA where the first data is stored within the memory and (2) the PNIB included in the PPN;
communicating the first VPN to the host file system in response to receiving the first data;
receiving the first VPN from the host file system;
generating the first PPN by substituting, within the first VPN, the first PBA corresponding to the first VBA included within the first VPN;
retrieving the first data from the memory using the identified first PPN; and
communicating the retrieved first data to the host file system in response to receiving the first VPN.

2. The method of claim 1, further comprising:
copying the first data stored at the first PBA to a second PBA of the memory; and
associating the second PBA with the first VBA corresponding to the first VPN.

3. The method of claim 2, wherein the PNIB identifying the first page within the first PBA in which the first data is stored is the same PNIB identifying a second page within the second PBA to which the first data is copied.

4. The method of claim 2, further comprising eliminating an association existing between the first VBA and the first PBA upon associating the first VBA with the second PBA.

5. The method of claim 4, further comprising erasing the first data stored at the first PBA upon eliminating the association between the first VBA and the first PBA.

6. The method of claim 5, further comprising identifying the first PBA as a free block for storing new data upon erasing the first data stored at the first PBA.

7. The method of claim 2, further comprising:
receiving second data from the host file system;
storing the second data at a second PPN of the second PBA;
associating the second PPN with a second VBA corresponding to a second VPN; and
communicating the second VPN to the host file system in response to receiving the second data.

8. A memory device comprising:
a nonvolatile memory; and
a memory controller that:
receives first data from a host file system;
stores the first data in a first physical block of the nonvolatile memory identified by a first physical page number (PPN), wherein the first PPN includes a first physical block address (PBA) identifying the first physical block and a page-number-in-block (PNIB) identifying a first page within the first physical block in which the first data is stored;
associates the first PPN with a first virtual page number (VPN), wherein the first VPN includes: (1) a first virtual block address (VBA) corresponding to the first PBA where the first data is stored within the nonvolatile memory and (2) the PNIB included in the PPN;
communicates the first VPN to the host file system in response to receiving the first data;
receives the first VPN from the host file system;
generates the first PPN by substituting, within the first VPN, the first PBA corresponding to the first VBA included within the first VPN;
retrieves the first data from the nonvolatile memory using the identified first PPN; and
communicates the retrieved first data to the host file system in response to receiving the first VPN.

9. The memory device of claim 8, wherein the memory controller further:
copies the first data stored at the first PBA to a second PBA of the nonvolatile memory; and associates the second PBA with the first VBA corresponding to the first VPN.

10. The memory device of claim 9, wherein the PNIB identifying the first page within the first PBA in which the first data is stored is the same PNIB identifying a second page within the second PBA to which the first data is copied.

11. The memory device of claim 9, wherein the memory controller further eliminates an association existing between the first VBA and the first PBA upon associating the first VBA with the second PBA.

12. The memory device of claim 11, wherein the memory controller further erases the first data stored at the first PBA upon eliminating the association between the first VBA and the first PBA.

13. The memory device of claim 9, wherein the memory controller further:
receives second data from the host file system;
stores the second data at a second PPN of the second PBA;
associates the second PPN with a second VBA corresponding to a second VPN; and
communicates the second VPN to the host file system in response to receiving the second data.

14. A non-transitory computer-readable storage medium storing instructions that when executed by a processor cause the processor to perform a method of accessing data within a memory, the method comprising:
receiving first data from a host file system;
storing the first data in a first physical block of the memory identified by a first physical page number (PPN), wherein the first PPN includes a first physical block address (PBA) identifying the first physical block and a page-number-in-block (PNIB) identifying a first page within the first physical block in which the first data is stored;
associating the first PPN with a first virtual page number (VPN), wherein the first VPN includes: (1) a virtual block address (VBA) corresponding to the first PBA where the first data is stored within the memory and (2) the PNIB included in the PPN;
communicating the first VPN to the host file system in response to receiving the first data;
receiving the first VPN from the host file system;
generating the first PPN by substituting, within the first VPN, the first PBA corresponding to the VBA included within the first VPN;
retrieving the first data from the memory using the identified first PPN; and
communicating the retrieved first data to the host file system in response to receiving the first VPN.

* * * * *